(12) United States Patent
Ali (10) Patent No.: US 7,920,654 B2
(45) Date of Patent: Apr. 5, 2011

(54) SIGNAL PROCESSING METHOD AND APPARATUS USING BIT CONFIDENCE VALUES

(75) Inventor: Danish Ali, South Croydon (GB)

(73) Assignee: ST-Ericsson SA, Plan-les-Ouates (CH)

( * ) Notice: Subject to any disclaimer, the term of this patent is extended or adjusted under 35 U.S.C. 154(b) by 663 days.

(21) Appl. No.: 10/539,355

(22) PCT Filed: Dec. 3, 2003

(86) PCT No.: PCT/IB03/05658
§ 371 (c)(1),
(2), (4) Date: Jun. 15, 2005

(87) PCT Pub. No.: WO2004/056058
PCT Pub. Date: Jul. 1, 2004

(65) Prior Publication Data
US 2006/0193403 A1     Aug. 31, 2006

(30) Foreign Application Priority Data
Dec. 17, 2002    (GB) .................................. 0229320.7

(51) Int. Cl.
*H04L 27/06*      (2006.01)
*H04L 27/22*      (2006.01)

(52) U.S. Cl. ........................................ 375/340; 375/329

(58) Field of Classification Search .................. 375/316, 375/267, 340, 341, 329
See application file for complete search history.

(56) References Cited

U.S. PATENT DOCUMENTS

| 4,742,533 | A | * | 5/1988 | Weidner et al. | 375/331 |
|---|---|---|---|---|---|
| 4,882,733 | A | * | 11/1989 | Tanner | 714/752 |
| 5,105,442 | A | * | 4/1992 | Wei | 375/262 |
| 5,233,629 | A | * | 8/1993 | Paik et al. | 375/262 |
| 5,233,630 | A | * | 8/1993 | Wolf | 375/308 |
| 5,396,518 | A | * | 3/1995 | How | 375/265 |
| 5,438,590 | A | * | 8/1995 | Tzukerman et al. | 375/259 |
| 5,633,881 | A | * | 5/1997 | Zehavi et al. | 714/756 |
| 6,005,897 | A | * | 12/1999 | McCallister et al. | 375/340 |
| 6,097,764 | A | * | 8/2000 | McCallister et al. | 375/298 |
| 6,236,685 | B1 | * | 5/2001 | Oppedahl | 375/265 |
| 6,434,200 | B1 | * | 8/2002 | Hessel | 375/265 |
| 6,466,629 | B1 | * | 10/2002 | Isaksson et al. | 375/316 |
| 6,529,559 | B2 | * | 3/2003 | Reshef | 375/262 |
| 6,658,071 | B1 | * | 12/2003 | Cheng | 375/348 |

(Continued)

FOREIGN PATENT DOCUMENTS

EP      0 625 829 A2     11/1994

(Continued)

OTHER PUBLICATIONS

Franz, V. et al. "Turbo-Detection for Enhanced Data for GSM Evolution", IEEE Vehecular Tech. Conference Sep. 19-22, 1999, vol. 5, p. 1-2.

(Continued)

*Primary Examiner* — Temesghen Ghebretinsae
(74) *Attorney, Agent, or Firm* — Timothy L. Boller; Seed IP Law Group PLLC (57) ABSTRACT

In a UMTS/GSM receiver with EDGE services capability, a data sequence incorporating PSK symbols is separated into bits which are assigned confidence values and input to convoluntional decoder (33) to provide improved decoding.

25 Claims, 3 Drawing Sheets

U.S. PATENT DOCUMENTS

| | | | |
|---|---|---|---|
| 6,691,263 B2* | 2/2004 | Vasic et al. | 714/709 |
| 6,697,441 B1* | 2/2004 | Bottomley et al. | 375/340 |
| 6,700,926 B1* | 3/2004 | Heikkila et al. | 375/221 |
| 6,731,700 B1* | 5/2004 | Yakhnich et al. | 375/341 |
| 6,798,852 B2* | 9/2004 | Khayrallah et al. | 375/341 |
| 6,823,027 B2* | 11/2004 | Malmberg et al. | 375/341 |
| 6,944,242 B2* | 9/2005 | Yakhnich et al. | 375/341 |
| 6,981,202 B2* | 12/2005 | Mikkola et al. | 714/790 |
| 6,993,070 B1* | 1/2006 | Berthet et al. | 375/232 |
| 7,042,938 B2* | 5/2006 | Malkov et al. | 375/233 |
| 7,106,813 B1* | 9/2006 | Ling | 375/343 |
| 7,136,435 B2* | 11/2006 | Kolze | 375/341 |
| 2002/0003846 A1* | 1/2002 | Khayrallah et al. | 375/341 |
| 2002/0004400 A1* | 1/2002 | Fischer et al. | 455/456 |
| 2002/0067777 A1* | 6/2002 | Jeong | 375/324 |
| 2002/0085651 A1* | 7/2002 | Gu | 375/344 |
| 2002/0122510 A1* | 9/2002 | Yakhnich et al. | 375/342 |
| 2002/0131489 A1* | 9/2002 | Allpress et al. | 375/233 |
| 2002/0133781 A1* | 9/2002 | Mikkola et al. | 714/790 |
| 2002/0150180 A1* | 10/2002 | Malmberg et al. | 375/341 |
| 2002/0154704 A1* | 10/2002 | Reshef | 375/262 |
| 2002/0159545 A1* | 10/2002 | Ramesh et al. | 375/340 |
| 2002/0168026 A1* | 11/2002 | Khoini-Poorfard | 375/303 |
| 2003/0033574 A1* | 2/2003 | Vasic et al. | 714/795 |
| 2003/0053535 A1* | 3/2003 | Malkov et al. | 375/233 |
| 2003/0061003 A1* | 3/2003 | Miyauchi et al. | 702/181 |
| 2003/0109227 A1* | 6/2003 | Chen | 455/75 |
| 2003/0115061 A1* | 6/2003 | Chen | 704/240 |
| 2003/0138065 A1* | 7/2003 | Mills et al. | 375/346 |

FOREIGN PATENT DOCUMENTS

| | | |
|---|---|---|
| EP | 0987863 A1 | 3/2000 |
| EP | 0987863 B1 | 3/2000 |
| JP | 2001292185 | 10/2001 |
| JP | 2002111754 | 4/2002 |

OTHER PUBLICATIONS

Technical Specification, 3GPP TS 45.004, v4.2.0 (Nov. 2001).

* cited by examiner

SIGNAL PROCESSING METHOD AND APPARATUS USING BIT CONFIDENCE VALUES

The present invention relates to a method of signal processing and to apparatus for signal processing.

European patent specification no. EP 0 987 863 A1 describes a system for demodulating a 8-PSK modulated signal involving splitting the symbol into its I and Q components and supplying these as input bits into a Viterbi decoder.

An article entitled "Turbo-detection for Enhanced Data for GSM Evolution" by V Franz and G Bauch, IEEE Vehicular Technology Conference, 19-22 Sep. 1998 vol 5 p 2954-8 describes a technique used to improve the equalisation and decoding by an iterative procedure in which the output from a convolutional decoder is re-coded and used to generate symbol probabilities before another attempt at equalisation (followed by another attempt at decoding).

This approach has the substantial disadvantage of requiring considerable processing power.

An object of the present invention is to provide improved demodulation of PSK signals.

Another object of the present invention is to provide improved decoding of transmitted symbols.

Another object of the present invention is to provide improved performance of the transmitted signals.

A further object of the present invention is to provide significant reduction in block error rate, without significant increase in required processing power.

According to the present invention, there is provided a method of processing a data signal comprising receiving a data sequence incorporating PSK symbols, separating the data sequence into bits of symbols, assigning a confidence value to each bit in a symbol, and effecting convolutional decoding of the bit stream associated with the assigned confidence values.

In this way, the method may provide enhanced performance of the decoding operation with reduced block error rate.

The method may include any one or more of the following features:—
- assigning a confidence value comprises mapping symbols to binary bits by means of a Gray code;
- incorporating data on the mapping determination in a look-up table for reference;
- re-coding hard decisions as an (I,Q) pair and taking soft decisions therefrom;
- demodulation by decision feedback equalisation with whitening matched filtering;
- using a digital processor for equalisation;
- using dedicated signal processing hardware for equalisation;
- de-interleaving, de-puncturing and incremental redundancy steps before convolutional decoding.

Another aspect of the present invention provides a computer program product directly loadable into the internal memory of a digital computer, comprising software portions for performing the steps of the method of the present invention when said product is run on a computer.

Another aspect of the present invention provides a computer program for performing the steps of the method of the present invention when said program is run on a computer.

The present invention also provides a carrier, which may comprise electronic signals, for a computer program embodying the present invention.

A further aspect of the present invention provides electronic distribution of a computer program of the method of the present invention.

A further aspect of the present invention provides apparatus for processing a data signal comprising means to receive a data sequence incorporating PSK symbols, mapping means to map the data sequence into bits of symbols and to assign a confidence value to each bit in the symbols, and means to effect convolutional decoding of the bit stream associated with the assigned confidence values.

A further aspect of the present invention provides a system for processing data signal incorporating such apparatus.

A further aspect of the present invention provides a look-up table derived from a method of the present invention or from apparatus of the present invention.

A further aspect of the present invention provides a method for using such a look-up table and apparatus for using such a look-up table.

The present invention is generally applicable to 8-level PSK signals, and particularly suited to digital cellular communications for example using the GSM standard especially incorporating the EDGE services.

It is also applicable to high-order Gray-coded constellation points (for example for CDMA 2000 standard and the UMTS standard) and to data coding and forward-error-correction. Furthermore, it is also applicable to digital video broadcasting and OFDM modulation.

In order that the invention may more readily be understood, a description is now given, by way of example only, reference being made to the accompanying drawings, in which:—

Figure 1:
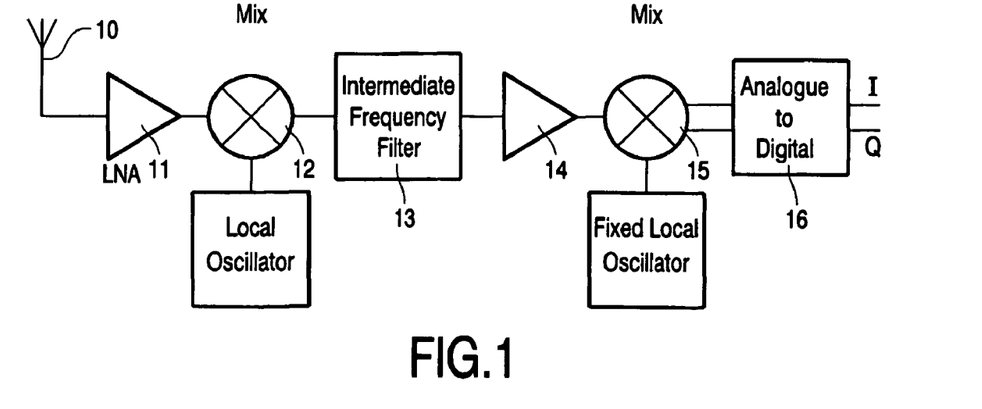
FIG. 1 is a block diagram of a radio receiver for a handset incorporating the present invention.

There is shown in FIG. 1 a dual-conversion receiver architecture for a UMTS/GSM receiver with EDGE services capability. GSM signals received at antenna 10 pass to low noise amplifier 11 and onto mixer 12 to be input to a low intermediate frequency unit 13 of 100 kHz (contrasting with a zero intermediate frequency for the CDMA node), thereby to allow integration of the channel filters (in this architecture channel filtering is performed digitally) without the performance loss associated with zero-IF receivers for narrowband systems, then passing to amplifier 14, and mixer 15, and on to A/D unit 16.

Details of the GSM/EDGE standard are disclosed in the 3G UMTS standard, see for example the Technical Specification published under reference 3GPP TS 45.004, v 4.2.0 (2001-11).

A cellular telephone handset is capable of receiving EDGE modulated signals and the EDGE (Enhanced Data-rates for GSM Evolution) protocol builds upon the successful GSM cellular telephone standard in order to give faster communication links while using the same amount of radio spectrum as GSM. The faster data transfer makes such actions as web browsing run at a tolerable speed on a handset; WAP handsets, which allowed web browsing using traditional GSM modulation have been found to be extremely slow.

GSM is a digital transmission scheme that uses time-division-multiple-access to allow up to eight handsets to simultaneously use the same 200 kHz frequency channel. When making a call, the transmitter at one end (and the corresponding receiver at the other end) is turned on for a burst lasting 156.25 bits at a bit rate of 270.833 kbits/s and left off for seven further burst periods before being turned on again. The modulation scheme is Gaussian-filtered minimum-shift-keying (GMSK), a form of frequency modulation.

The bit rate is sufficiently high that typical propagation conditions result in inter-symbol-interference (ISI). To allow for this, a training sequence 20 (a predefined sequence of bits) is transmitted as part of the burst. The signal received when this training sequence is due is used to work out how the radio propagation conditions have distorted the signal, as well as providing timing and phase references using estimator 21.

As well as several copies of the transmitted signal (all at different times and with different amplitudes and phases) there is also noise, be it thermal noise or interference from other cells using the same frequency.

Equaliser 22 determines what was the transmitted sequence, by working out a likely sequence of bits given a received sequence of samples and the ISI deduced from the training sequence 20.

For GSM, a popular equaliser is the Viterbi equaliser, which relies on each bit only affecting a small number of bits after it (a window, typically up to 9 bits long). By working out the probabilities of all possible sets of 9 bits being transmitted given the received sequence and the expected inter-symbol-interference, the most likely set has the correct first bit.

This bit is then fixed, and the remaining bits are shifted down, with a new unknown bit and corresponding received samples being considered in the window. The number of different sequence probabilities which must be simultaneously considered is $2^9=512$ (with a different 512 for each bit). By considering all possible sequences within the window, the Viterbi equaliser gives very good results.

Even with the Viterbi equaliser, results are not perfect. As one gets further from the training sequence, the risk of bit errors gets larger. For this reason, the GSM standard places important bits close to the training sequence 20 and less important bits further away at the ends of the burst. Under typical urban conditions, the minimum acceptable standard is to have 8% of bits decoded wrongly. This gives rise to clicks and whistles on top of the voice one is listening to, but it is generally tolerable.

For sending digital information, further error correction is necessary. Convolutional coding is used, typically ½-rate (so that for every information bit to be transmitted, a sequence of two bits is actually transmitted). Convolutional coding is more complicated than simple repetition, and the performance improvement correspondingly better than repetition.

One measure of the quality of a coding scheme is the "minimum distance"—how many bits in a coded sequence have to be wrong before another valid coded sequence has been created. Where a bit is received in error, it does not fit in with the bits before or after it. The Viterbi maximum-likelihood-sequence algorithm is therefore applied to decode the bit sequence.

On a radio channel, bit errors are likely to occur in bursts, for example because the equaliser 22 has moved too far from the training sequence 20, or because of a spark of noise, or because of a short fade. Since convolutional coding uses nearby bits to correct a bad bit, it is useful to interleave the bits, so that the nearby bits for decoding are not nearby for propagation.

Because of all the overheads of training sequences, convolutional coding, control information and the ⅛ duty cycle, the 270.833 kbit/s raw bit rate translates to 9600 data bits/s when using a GSM data link.

EDGE introduces two changes to the GSM standard: more options for data coding, and modulation that is more efficient.

When propagation conditions are known to be good enough, so that the raw bit error rate is much less than 8%, weaker convolutional coding may be used (or none at all). While it is possible to use (for example) a ⅔-rate convolutional coder, this is not the approach taken by the EDGE standard. Instead, it uses the ½-rate coder, but then discards a portion of the output bits, evenly distributed, in a process called puncturing. This allows bit-rates to be increased to 17.6 kbit/s.

As well as GMSK, the option for 8-symbol phase-shift-keying (8PSK) is introduced in the EDGE standard. This is done at the same symbol rate (270833 symbols/s) and in the same modulation bandwidth (200 kHz), but since three bits can be sent per symbol, the raw bit rate is tripled to 812.5 kbit/s. While retaining the ⅛ duty cycle (hence the amount of channel capacity allocated to one user), the useful data rate increases to 59.2 kbit/s when conditions are sufficiently good.

One downside to the modulation change is that a Viterbi equaliser would need to keep track of $8^9=134217728$ sequence probabilities, and even with the advances in computing power since the introduction of GSM it would be impractical to perform this many calculations for each symbol being decoded. Demodulation is therefore done with a different technique, for example a decision feedback equaliser with whitening matched filter. After depuncturing and deinterleaving, a Viterbi decoder is still the best choice for removing the convolutional coding.

Because power efficiency is important in battery-powered cellular telephones, the receiver is active only when a burst intended for the handset is expected. The analogue radio parts are powered up during the burst. The digital signal processing essentially is delayed until the burst is complete, with the whole burst being processed as a single vector.

Figure 2:
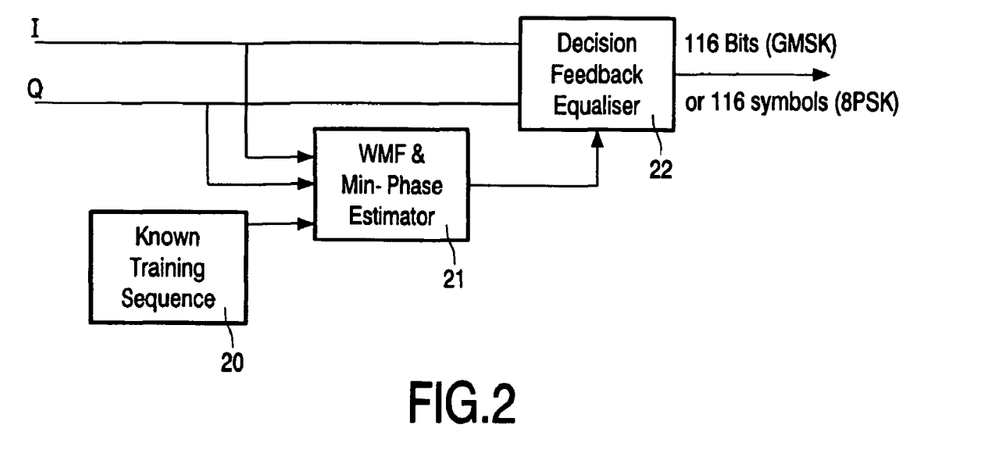
FIG. 2 is a block diagram of an equaliser incorporating the present invention.

Because equalisation at equaliser 22 is done from the training sequence 20 outwards (so both forwards and backwards in time), the implementation must use memory, and this is easiest in the digitial domain. The equaliser algorithm may be implemented as software in a digital signal processor, but it could alternatively be implemented as dedicated signal processing hardware. The output from equaliser 22 is 116 bits (GMSK) or symbols (8 PSK), namely 157.25 less the training sequence and guard spaces as shown in FIG. 2. The 8PSK symbols are mapped to bits by a mapping means 28 which also assigns a confidence value to each bit in a symbol.

Figure 3:
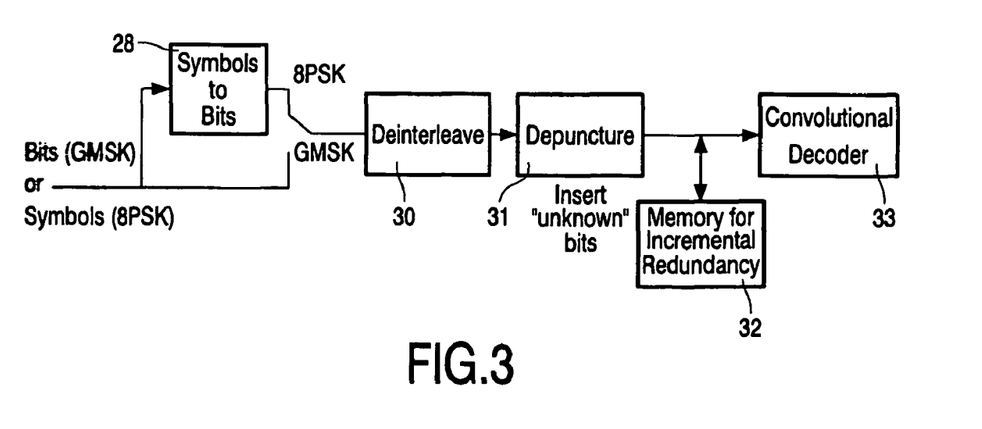
FIG. 3 is a block diagram of the remainder of the signal processing of the present system.

The interleaving 30, depuncturing 31 and incremental redundancy blocks 32 follow as shown in FIG. 3. The symbols-to-bits mapping increases the number of bits fed to the deinterleaver 30 from 116 to 348.

Even in the absence of soft decisions from the equaliser, the convolutional decoder 33 works most effectively if it is arranged to take soft inputs, because the values of the punctured bits are unknown, rather than being received as either 1 or 0 (subject to noise and interference).

The decoder 33 can take in (for example)+1.0 as being reasonably confident logic 1, −1.0 as being reasonably confident logic 0, and 0.0 to indicate that a bit is equally likely to be 1 or 0.

The present invention ensures improved mapping of symbols to bits, taking advantage of the fact that the convolutional decoder takes soft inputs.

Examination of the PSK symbols shows that some of the decoded bits are known with more confidence than other bits because even if the correct symbol turned out to be one next to the one selected by the equaliser, one of the bits would remain unchanged. Taking the "reasonably confident" bits to have values of ±1.0, the "very confident" bits were assigned values of ±α, where α is a value greater than 1.0. The optimum value for a depends on the propagation conditions (probably the relative strengths of inter-symbol-interference after equalisation and noise/interference). Since it is difficult to measure what the propagation conditions are, a fixed value of α is proposed, the value being determined by system simulation beforehand. The value chosen is a compromise, and could be weighted towards parts of the standard that are considered difficult to meet, or towards conditions that are most likely to occur in practice.

Where the set of symbols and bits is more complicated (eg 16 QAM or 64 QAM), there might need to be more levels of confidence, but they can still be put into a lookup table from "symbol decoded by equaliser" to "probability that each bit is a 1 or 0".

If the equaliser is able to produce greater information, by determining where the constellation point is on the complex plane rather than which symbol is closest, even better results will be obtained by interpolating between specified points in the lookup table.

Essentially, the present invention is a development from the conventional system involving a decision-feedback equaliser which produces hard decisions and chooses the most likely symbol given the received signal, but provides no further information about how close the received signal was to that symbol or whether there was another symbol almost as likely. In this conventional system, there is a direct translation between symbols and the binary patterns they represent. One such system takes hard symbol decisions and produces equally hard binary output. Although this conversion is correct, it does not indicate the different degree of confidence in which bits are held, assuming that the symbol might be in error.

Figure 4:
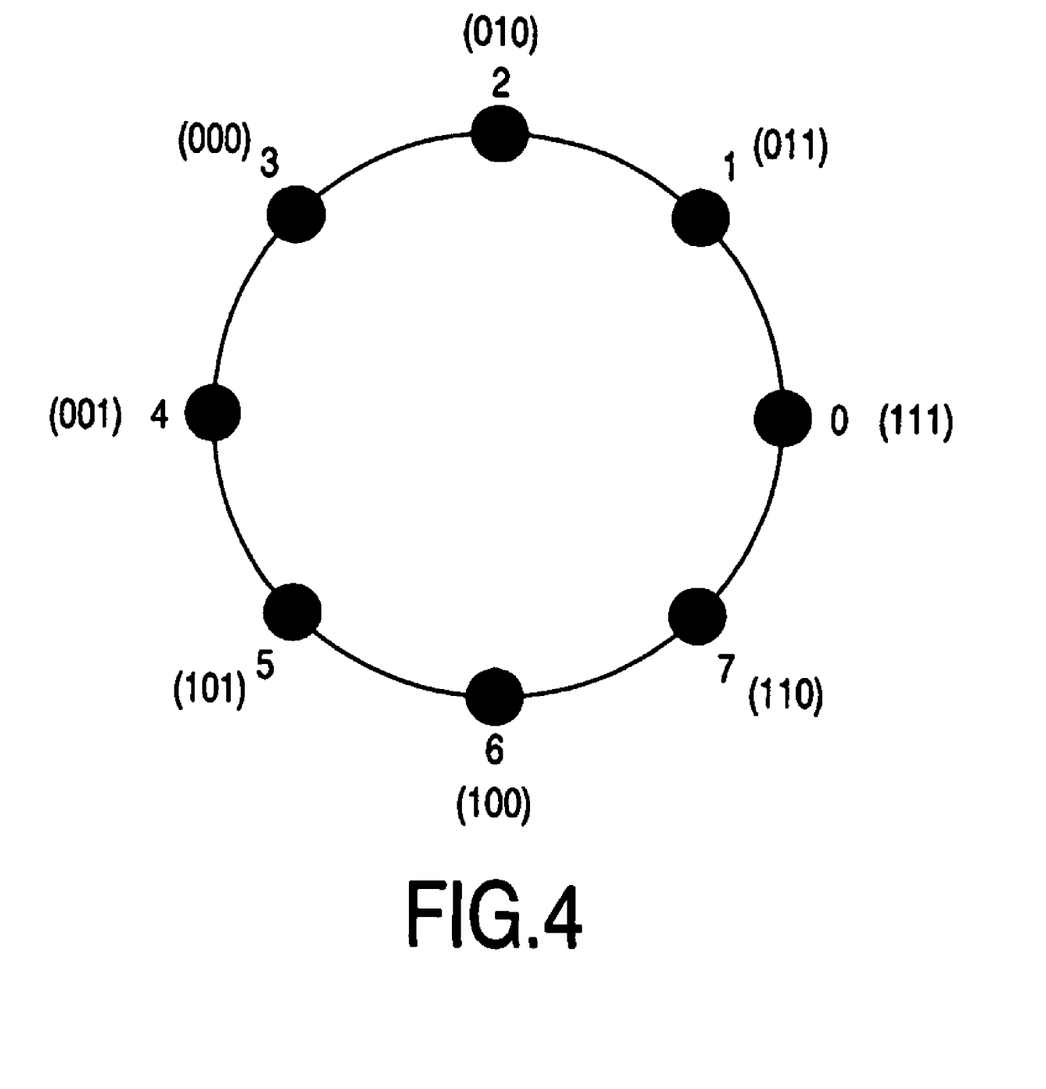
FIG. 4 is a schematic diagram of 8-PSK modulation.

With 8-PSK modulation, the symbols are equally spaced around a circle, as shown in FIG. 4. In order to reduce the bit error rate should transmitted symbol 6 be mistakenly decoded as symbol 5, these symbols are mapped to binary bits by means of a Gray code, shown in Table 1.

TABLE 1

| 8-PSK Symbol | Bit 0 | Bit 1 | Bit 2 |
|---|---|---|---|
| 0 | 1 | 1 | 1 |
| 1 | 0 | 1 | 1 |
| 2 | 0 | 1 | 0 |
| 3 | 0 | 0 | 0 |
| 4 | 0 | 0 | 1 |
| 5 | 1 | 0 | 1 |
| 6 | 1 | 0 | 0 |
| 7 | 1 | 1 | 0 |

If one decodes symbol 5 in the presence of noise, it could be that the transmitted symbol was actually 4 or 6. Looking at the binary patterns in Table 1, it is clear that whether the transmitted signal was 4, 5 or 6, bit 1 is still be zero. Bit 0 or bit 2, which in symbol 5 would decode as ones, might be zero if the transmitted symbol was actually 4 or 6 respectively. Therefore, when symbol 5 is received, bit 1 is known to be zero with greater confidence than one knows bits 0 and 2 to be ones.

A similar analysis is applied to all eight symbols. Writing a confident mapping of one as +α over the normal value of +1, and confident mapping of zero as −α over the normal value of −1 there results an improved mapping table, shown as Table 2 (which indicates improved mapping of 8-PSK bits to give softer input to convolutional decoder). With α being some value greater than unity, the hard decisions of 8-PSK symbols can therefore be transformed into softer decisions that are fed to the convolutional decoder. This technique has no impact on the raw bit error rate, but can significantly improve the coded bit- and block-error-rates.

TABLE 2

| 8-PSK Symbol | Bit 0 | Bit 1 | Bit 2 |
|---|---|---|---|
| 0 | 1 | α | 1 |
| 1 | −1 | α | 1 |
| 2 | −α | 1 | −1 |
| 3 | −α | −1 | −1 |
| 4 | −1 | −α | 1 |
| 5 | 1 | −α | 1 |
| 6 | α | −1 | −1 |
| 7 | α | 1 | −1 |

The optimum value for a depends on propagation conditions. Under static sensitivity conditions, the optimum value has been determined to be around 3.4, delivering up to 4 dB reduction in SNR required to achieve the specified block-error-rate. Since the toughest test is a TU50 co-channel, α must be optimised for those conditions. From simulations summarised in Table 3 (which shows benefits observed for improved decoding under TU50 Co-channel conditions), it was concluded that the optimum value for α is 1.7, with an improvement in receiver performance around 0.7 dB. This is a small improvement, but significantly advantageous.

TABLE 3

| Coding Scheme | C/I ratio of interest (dB) | Optimum value for α | Benefit (dB) |
|---|---|---|---|
| ECSD 28.8 NT | 13-15 | 1.7 | 0.5 |
| EGPRS MCS-5 | 13-15 | 1.9 | 1.0 |
| ECSD 28.8 T | 15-17 | 1.7 | 0.5 |
| EGPRS MCS-6 | 15-17 | 1.7 | 1.0 |
| ECSD 32 T | 16-18 | 1.7 | 0.4 |
| ECSD 43.2 NT | 18-20 | 1.7 | 0.5 |
| EGPRS MCS-7 | 21-23 | No optimum value | 0.4 |
| EGPRS MCS-8 | 21-23 | No optimum value | 0.1 |
| EGPRS MCS-9 | 23-25 | No optimum value | negligible |

Thus, the present invention concerns the radio receiver used in cellular telephones supporting the EDGE standard (enhanced data rates for GSM evolution). In this standard, data bits are convolutionally coded and then Gray coded onto 8-PSK symbols. The Grey coding ensures that only one bit error occurs if (due to noise) the received symbol is adjacent to the symbol transmitted.

As another example, if the transmitted symbol was 110, and the receiver made an error and chose an adjacent symbol (either 111 or 100), in either case there would only be one bit in error.

In known systems, hard decisions are used, in that the demodulator has to choose one symbol—it cannot say that the signal is somewhere between two of the symbols. This is because the demodulator has many things to handle when sorting out inter-symbol-interference (a major problem in GSM/EDGE).

These symbols are then converted into a bit stream for feeding to the convolutional decoder. In one known system, the conversion done is direct binary to integer (using the mapping, 1 maps to +1 and 0 maps to −1).

The present invention involves an improved conversion which uses the observation that the bits in a symbol are known to different levels of confidence. If one looks at symbol 110, it might really be 111 or 100. The leading 1 is known much more strongly than the other two bits. It should therefore be mapped to some other value, more positive than 1. Let this value be α, a constant value greater than or equal to 1. 110 then maps to α, 1, 0). The full mapping table becomes:—

000→(−α, −1, −1)
001→(−1, −α, 1)
010→(−α, 1, −1)
011→(−1, α, 1)
100→(α, −1, −1)
101→(1, −α, 1)
110→(α, 1, −1)
111→(1, α, 1)

These can then be used by convolutional decoder 33 as soft decisions, giving a much better performance.

When α is 1.0 (the reference performance) MCS-5 coding with a co-channel interferer 8 dB below the wanted signal, a block error rate of 0.311 is observed. If α is increased to 3.4, the block error rate drops to 0.044. This is equivalent to an improvement in signal-to-interferer ratio of more than 2 dB. Values of between 3 and 4 give the best results, although it is not critical.

Thus the data on the mapping determination is incorporated in a look-up table which is referenced by units of the receiver as appropriate.

Thus, in the present invention, Gray coding ensures that only one bit error occurs if (due to noise) the decoded symbol is adjacent to the symbol transmitted, e.g. the adjacent symbols to 110 are 111 and 100.

In the invention, it is proposed that soft decisions are made by the demodulator, assigning increased confidence to the bit in a symbol which is the same in adjacent symbols. In the example above, the first bit is known to be 1 with a much higher degree of certainty than the value of the other two bits. For this example, using binary to integer mapping (so that 1 maps to +1 and 0 to −1) the symbol is represented as (α, 1, −1). These values are then used by a standard convolutional decoder. Values of α between 3 and 4 have been found to give particularly good results.

The known prior art takes the starting position that one has I and Q components of received signals (with no mention of how multipath propagation, which leads to inter-symbol interference, is mitigated). They only establish that one can generate soft decisions on all bits, depending on where the measured (I,Q) vector ended up.

The present invention starts with the output from a multipath equaliser which produces hard decisions, thereby losing useful information, good results being obtained from an equaliser that generates soft decisions.

The present invention takes the hard decisions, re-codes them as an (I,Q) pair, and then takes soft decisions from that. In this way the present invention gets soft decisions out of a decision-feedback equaliser.

The present invention softens the decisions made by equalisers which produce hard decisions.

This invention may provide significant reduction in block error rate, without significant increase in required processing power.

The present invention is particularly applicable to the implementation of receivers for EDGE phones (enhanced GSM data rates), and other receivers for standards using gray-coded symbols.

Figure 5:
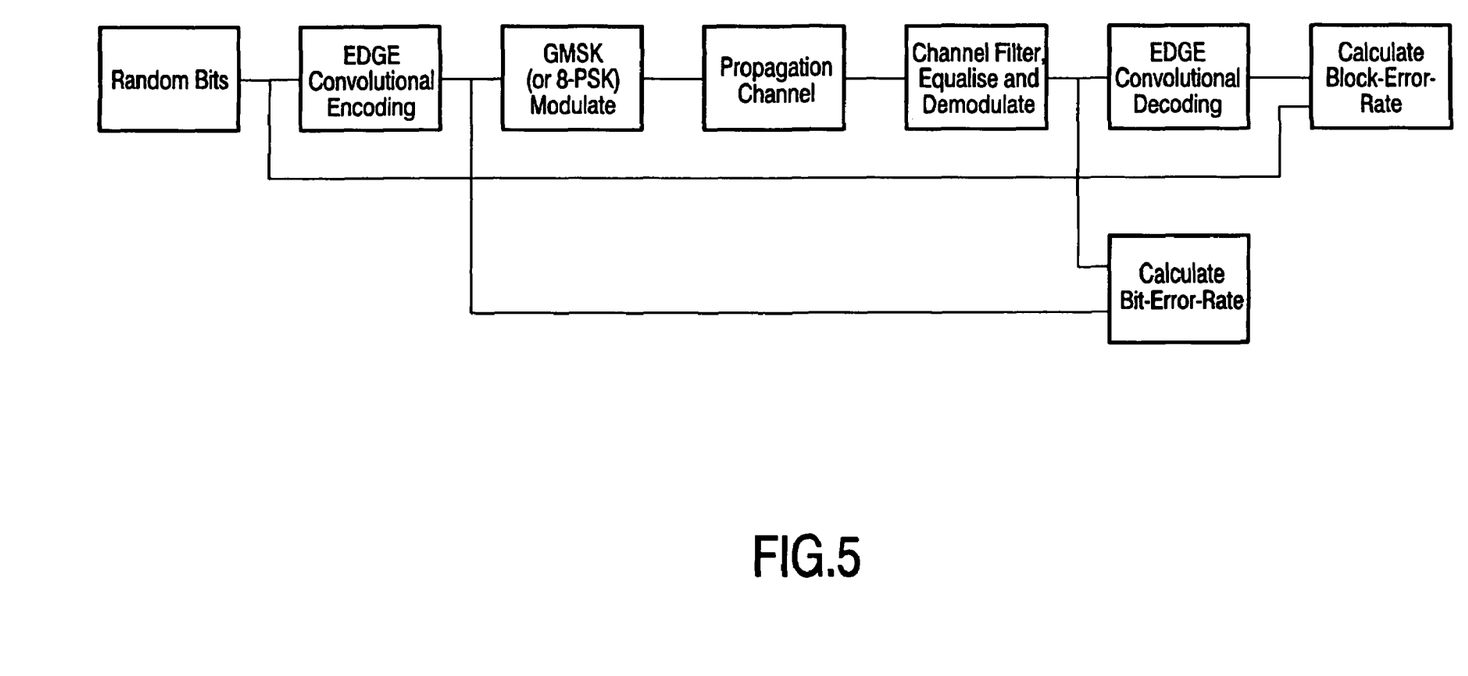
FIG. 5 shows a block error testing system.

In FIG. 5, there is shown a bit-and block-error-rate testing system which has been used to obtain the results shown in Table 3.

The raw (uncoded) bit error rate and block-error-rate for EDGE coded data were measured in the same simulation to allow direct comparsions of performance using the system in FIG. 5. The new blocks are shown with shadowing. The difference as far as bit-error-rate calculations are concerned is that the bit sequence being used is the output of convolutional encoder 33 fed with random bits, rather than raw random bits. This does not make a significant difference because the demodulator is unaware of forbidden bit-sequences, but there might be some change in the statistics of transitions.

To determine if this would alter the simulated performance of the system, static sensitivity tests were run with both random bits and random bits fed through the EDGE encoder from which it is evident that for signals in the range −115 dBm to −100 dBm, the difference between raw bits for coded and uncoded systems is small.

In the present specification and claims the word "a" or "an" preceding an element does not exclude the presence of a plurality of such elements. Further, the word "comprising" does not exclude the presence of other elements or steps than those listed.

The inclusion of reference signs in parentheses in the claims is intended to aid understanding and is not intended to be limiting.

From reading the present disclosure, other modifications will be apparent to persons skilled in the art. Such modifications may involve other features which are already known in the art of signal processing and which may be use instead of or in addition to features already described herein.

The invention claimed is:

1. A method of processing a data signal comprising symbols each representing a plurality of data bits, the method comprising:
   demodulating the data signal to determine a hard value of each symbol;
   mapping the hard value of each of the symbols to a plurality of data bits, each data bit having an assigned confidence value based on a mapping table defining for each symbol hard value a plurality of data bits each having an assigned confidence value, the mapping including assigning an increased confidence value to a bit if bits in a same position in adjacent symbols are the same as the bit; and
   effecting convolutional decoding of a bit stream associated with the assigned confidence values.

2. A method according to claim 1 wherein the mapping the hard value of each of the symbols to a plurality of data bits includes using a Gray code.

3. A method according to claim 1, further comprising:
   incorporating data on the mapping in a look-up table for reference.

4. A method according to claim 1 comprising re-coding hard decisions as an (I,Q) pair and taking soft decisions therefrom.

5. A method according to claim 1 comprising demodulation by decision feedback equalization with whitening matched filtering.

6. A method according to claim 1 comprising using a digital processor for equalization.

7. A method according to claim 1 using dedicated signal processing hardware for equalization.

8. A method according to claim 1 comprising de-interleaving, de-puncturing and incremental redundancy steps before convolutional decoding.

9. A non-transitory computer program product having contents directly loadable into the internal memory of a digital computer, the contents comprising software code portions for processing a data signal, the data signal comprising symbols each representing a plurality of data bits, when said code portions are run by a computer carrying out the steps of:
   demodulating the data signal to determine a hard value of each of the symbols;

mapping the hard value of each of the symbols to a plurality of data bits, each data bit having an assigned confidence value based on a mapping table defining for each symbol hard value a plurality of data bits each having an assigned confidence value, the mapping including assigning an increased confidence value to a bit if bits in a same position in adjacent symbols are the same as the bit; and effecting convolutional decoding of a bit stream associated with the assigned confidence values.

10. An apparatus for processing a data signal comprising symbols each representing a plurality of data bits, the apparatus comprising:

means to receive the data signal;

means to demodulate the data signal to determine a hard value of each of the symbols;

mapping means for mapping the hard value of each symbol to a plurality of bits, each bit having an assigned confidence value based on a mapping table defining for each symbol hard value a plurality of data bits each having an assigned confidence value, wherein an increased confidence value is assigned to a bit if bits in a same position in adjacent symbols are the same as the bit; and means for effecting convolutional decoding of a bit stream associated with the assigned confidence values.

11. An apparatus according to claim 10 wherein the mapping means is adapted to map the hard value of each of the symbols to a plurality of data bits by a Gray code.

12. An apparatus according to claim 10, further comprising a look-up table incorporating data on the mapping.

13. An apparatus according to claim 10 comprising means to re-code hard decisions as an (I,Q) pair and means to take soft decisions therefrom.

14. An apparatus according to claim 10 comprising demodulation by decision feedback equalization with whitening matched filtering.

15. An apparatus according to claim 10 comprising a digital processor for equalization.

16. An apparatus according to claim 10 comprising dedicated signal processing hardware for equalization.

17. An apparatus according to claim 10 comprising means to de-interleave, depuncture, and effect incremental redundancy before convolutional decoding.

18. The non-transitory computer program product of claim 9 wherein the mapping comprises retrieving confidence values from a look-up table.

19. The non-transitory computer program product of claim 18 wherein the mapping further comprises interpolation between confidence values in the look-up table.

20. The method of claim 1 wherein the mapping further comprises interpolation between confidence values stored in a look-up table.

21. The apparatus of claim 10 wherein the mapping means is configured to interpolate between confidence values stored in a look-up table.

22. An apparatus for processing a data signal comprising symbols representing data bits, the apparatus comprising:

a demodulator configured to extract a hard value of each of the symbols from the signal;

a symbol mapper configured to map the hard value of each symbol to a respective plurality of bits each having a confidence value based on a mapping table defining for each symbol hard value a plurality of data bits each having an assigned confidence value, wherein the symbol mapper is configured to assign an increased confidence value to a bit if bits in a same position in adjacent symbols are the same as the bit; and a convolutional decoder configured to decode a bit stream associated with the assigned confidence values.

23. The apparatus of claim 22 wherein the symbol mapper is configured to map the hard value of each of the symbols to the respective plurality of bits using a Gray code.

24. The method of claim 1 wherein the data signal comprises 8-PSK signals and each confidence value is determined from a set $[-\alpha, -1, 1, \alpha]$, where $\alpha$ is a constant.

25. The method of claim 24 wherein the value of $\alpha$ is 1.7.

* * * * *

UNITED STATES PATENT AND TRADEMARK OFFICE
CERTIFICATE OF CORRECTION

| | |
|---|---|
| PATENT NO. | : 7,920,654 B2 |
| APPLICATION NO. | : 10/539355 |
| DATED | : April 5, 2011 |
| INVENTOR(S) | : Danish Ali |

It is certified that error appears in the above-identified patent and that said Letters Patent is hereby corrected as shown below:

Column 10
Claim 24, Line 37, "from a set [-α, -1, 1, α], where αis a constant." should read as, --from a set [-α, -1, 1, α], where α is a constant.--.

Column 10
Claim 25, Line 38, "25. The method of claim 24 wherein the value of αis 1.7." should read as, --25. The method of claim 24 wherein the value of α is 1.7.--.

Signed and Sealed this
Seventeenth Day of May, 2011

David J. Kappos
*Director of the United States Patent and Trademark Office*